United States Patent [19]

Livorsi

[11] 4,372,530

[45] Feb. 8, 1983

[54] VALVE AND SEAL

[75] Inventor: Carl F. Livorsi, Warwick, R.I.

[73] Assignee: Quartrol Corporation, Birmingham, Ala.

[21] Appl. No.: 270,910

[22] Filed: Jun. 5, 1981

[51] Int. Cl.³ .............................................. F16K 25/00
[52] U.S. Cl. ................................... 251/173; 251/306; 251/317
[58] Field of Search ........................ 251/173, 306, 317

[56] References Cited

U.S. PATENT DOCUMENTS

| | | | |
|---|---|---|---|
| 3,540,696 | 11/1970 | Fawkes | 251/306 |
| 4,088,299 | 5/1978 | Maciolaitis | 251/173 |
| 4,165,859 | 8/1979 | Maciolaitis | 251/173 |
| 4,344,632 | 8/1982 | Green | 251/173 X |

FOREIGN PATENT DOCUMENTS 927502  5/1963  United Kingdom ................ 251/306

*Primary Examiner*—Harold W. Weakley
*Attorney, Agent, or Firm*—Wood, Herron & Evans

[57] ABSTRACT

A butterfly valve is disposed in a valve body for sealing engagement with a resilient seat ring disposed in a tapered groove defined by the valve body and a retaining ring. A metallic back-up ring is disposed between two legs of the seat ring to support a sealing portion thereof when the valve is closed. Flanges on the legs retain the seat ring together with the backup ring in the groove. Parallel walls at the bottom of the groove insure seat ring and back-up ring retention. An "O" ring is disposed between the back-up ring, the flanges and the groove bottom and pressurized fluid passageways are provided to produce a two-way pressure assist for sealing.

30 Claims, 4 Drawing Figures

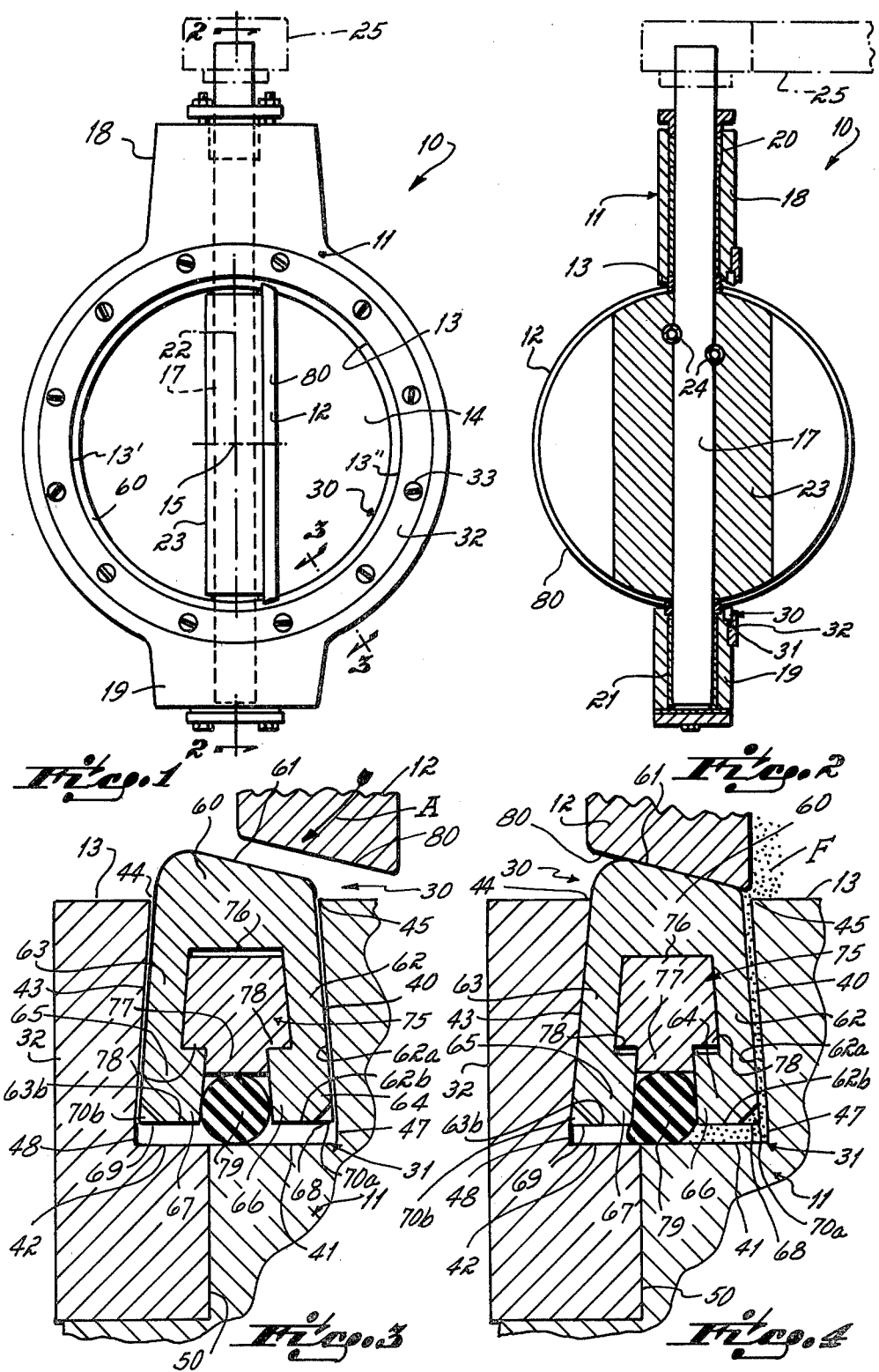

VALVE AND SEAL

This invention relates to valves and, more particularly, to disk or butterfly valves and sealing rings therefor.

In the valve industry, it is known to provide a valve body with an interior circumferential groove and to utilize a circular seat ring in the groove for sealing against the periphery of a closed, rotatable, "butterfly" valve disk. Such prior devices, however, are susceptible to several potential disadvantages. For example, the pressures exerted by the disk and the fluid system tend to cause many resilient type valve seats to cold flow, thus destroying design tolerances and causing performance deterioration. Moreover, the need to retain the seat ring within the groove is a consideration which must be satisfactorily accomplished, Some efforts have been made to use lugs or ears at the groove mouth but those are not totally satisfactory since they are susceptible to erosion at small valve openings and high velocity fluid movement.

It should also be noted that while manufacturers attempt to provide circular butterfly valve disks, it is difficult to produce a true circle at the peripheral edge of the disk. Flat spots on this sealing edge, or imperfections therein cause sealing problems and leaks between the imperfect disk and the seat ring. It is thus desirable to accommodate such flat spots without loss of sealing performance.

Further, while pressure assisted valves are known in the industry, it is now desired to provide a pressure-assisted valve structure, of the bi-direction butterfly valve type, which will overcome the above disadvantages.

Finally, it will be appreciated that while it is known to generally provide circumferential valve seals, many of these are made from polytetrafluoroethylene ("TEFLON") or other resinous materials which tend to cold flow under load resulting in loss of tolerances and sealing performance. It is now desirable to provide an improved valve seal of these or similar materials and incorporating means to eliminate or reduce this problem.

Accordingly, it has been one object of this invention to provide an improved butterfly valve.

A further objective of this invention has been to provide an improved bi-directional, pressure-assisted butterfly valve.

A further object of this invention has been to provide an improved seal or seat ring for use in valves.

To these ends, a preferred embodiment of this invention includes a valve body, a rotatable valve disk, and an improved disk seal disposed in a dove-tail shaped groove in the valve body.

The groove is preferably defined by the valve body, comprising one groove side wall and a portion of the groove bottom, and a removable circular retaining ring forming the other groove wall and remainder of the groove bottom.

The seal includes a resilient seat ring having a sealing portion, extending through the mouth of the groove for engagement by the disk, and two diverging legs extending rearwardly from the sealing portion. A metallic back-up ring is disposed circumferentially around the sealing portion and the diverging legs of the seat extend along the sides of the back-up ring. The back-up ring and sealing portion normally have a clearance between them when the valve is open, and each side leg has inwardly extending rear flanges engaging an outer surface of the back-up ring. When the valve is closed, the sealing portion is expanded to engage the back-up ring and the leg flanges are moved radially outward out of engagement with the back-up ring.

An "O"-ring is disposed around the back-up ring and between these flanges, and provides a secondary seal between the groove walls, flanges and back-up ring. This facilitates the sealing function of the seal when pressurized fluid migrates behind the seal through passages or notches cut into peripheral outer edges of the legs of the seat ring.

One of the unique features of the invention is the cooperation of the seat ring with the back-up ring and the result of that cooperation with respect to eliminating or reducing cold flow of the seat ring. More particularly, when the disk is open, the sealing portion of the seat ring is slightly spaced from the back-up ring. When the disk is closed, the sealing portion is compressed between the disk and the back-up ring which slightly expands. This serves to produce a light seal around the disk, even at irregular or flat areas, the metal back-up ring producing substantial inward sealing forces. Once the disk is reopened, the back-up ring slightly constricts the resilient ring back toward its original tolerances, and the effects of any cold flow, which might occur to flatten or stretch out the seat ring, are significantly reduced or eliminated.

Accordingly, the back-up ring serves two primary functions, one to compress the resilient seat ring about the disk for sealing and another to constrict the seat ring back toward its original position, once the valve disk is opened in order to reduce or eliminate the effect of cold flow of the seat ring material.

Also, it will be appreciated that the back-up ring serves an important third function and that is to retain the seat ring in the groove. This occurs as a result of the engagement of back-up ring by the inward flanges of the legs of the seat ring. This feature of the invention eliminates any necessity for thin inward flanges or ears at the mouth of the groove in which the seat ring resides, and the necessary shoulders for abutting the flanges to hold the seat ring in the groove. Such flanges in prior art devices have several disadvantages including increased and undue wear, particularly as a result of high fluid velocities when the disk is only slightly opened.

Another feature of the invention is that it provides a pressure-assisted seal in combination with the above features. This results from the relationship of the seat ring to the back-up ring, the "O"-ring and the groove bottom and walls, as will be appreciated. More particularly, the groove is preferably located in the valve body and has side walls diverging away from the mouth of the groove toward a groove bottom wider than the mouth. At an outer end of each diverging side wall, the side walls include parallel bottom portions extending from the diverging portion to the groove bottom. Preferably, the diverging side legs of the seat ring parallel and engage the respective diverging side walls of the groove. When the valve disk is closed, however, the seat ring is expanded by the disk into the groove. As the leg ends move toward the groove bottom, they are held, by the parallel side walls, from diverging further apart. Additionally, the parallel side walls serve to urge the leg ends into contact with the "O"-ring to provide a secondary seal and to keep them in contact with the back-up ring.

When the disk is closed, upstream pressurized fluid acts on the seat ring, pushing the upstream leg of the ring away from the adjacent side wall of the groove. The pressurized fluid migrates between the leg and side wall and through the passages or notches in the seat leg into a space between the leg end and groove bottom. This exerts radially inward pressure on the leg and sealing portion toward the disk periphery, enhancing and assisting the seal.

Of course, the "O"-ring, compressed between the expanded seat ring and groove retains the fluid in this space so that it does not leak toward the other side of the ring. Additionally, the pressure exerted by the fluid between the groove wall and leg pushes the seat ring sideways in the groove, sealing the other leg against the opposite groove wall and further enhancing and assisting the seal.

It will be appreciated that the seat ring has a disk sealing surface inclined away from the fluid passageway in an upstream direction. Even so, it is operational for bi-directional movements of the valve disk. This is accounted for in part, by the fact that the valve disk is off-center with respect to the axis of rotation of the disk turning shaft, and thus can be turned into the seat from either side as is known in the art.

It should also be appreciated that the seat ring could be disposed in a groove in the valve body as described, or in the disk or valve element periphery for sealing against an appropriately shaped interior wall of the valve's fluid passageway.

By these means, this invention provides an improved bi-directional butterfly valve providing improved sealing with a simplified easily maintained seal structure, together with a pressure-assist capability.

These and other objects and advantages will become readily apparent from the following detailed description of a preferred embodiment of the invention and from the drawings in which:

FIG. 1 is an elevational view of the retaining ring side of a valve according to the invention and showing the valve open;

FIG. 2 is a cross-sectional view taken on lines 2—2 of FIG. 1;

FIG. 3 is an enlarged cross-sectional view taken along lines 3—3 of FIG. 1, but illustrating the closing motion of one-half the disk circumference with the seat; and FIG. 4 is a cross-sectional view similar to FIG. 3, but showing the valve disk in a closed position, the upstream or pressurized side being to the right.

Turning now to the drawings, and particularly to FIG. 1 thereof, there is shown in FIG. 1 a valve 10 according to the present invention. While it will be appreciated that the valve 10 shown in FIG. 1 constitutes a butterfly type disk valve, it should be appreciated that the valve seal, which will be hereinafter discussed in detail, could be utilized with various types of valves or sealing members to provide a seal between one portion of the valve and another portion of the valve. The following description, however, is directed in detail to the valve seal utilized in the valve 10 in FIG. 1 comprising a butterfly valve.

While valves according to the invention herein may be useful in a number of different pressure and size circumstances, the butterfly valves primarily contemplated herein are generally of a size from 2 inches up to 24 inches in inside diameter. Without limitation, however, these valves may be used in configurations up to 48 inches in diameter, or larger. Moreover, the valves contemplated herein are primarily of the type which are industry approved for 150 p.s.i., or for 300 p.s.i. service. Such valves accommodate higher, lower, and intermediate pressures as well.

The butterfly valve 10 includes a valve body 11 and a movable valving member, such as the butterfly disk 12. The valve body 11 has an interior surface 13 (FIG. 2) which comprises a fluid passageway 14, and the disk 12 is selectively rotatable in the passageway 14 to permit the flow of fluids therethrough in various rates or to obstruct and seal the flow through the valve body.

As shown in FIGS. 1 and 2, the butterfly valve disk 12 is mounted on a shaft 17 which is respectively journalled in an upper portion 18 and a lower portion 19 of the valve body 11. Suitable seals, such as sleeves, bushings or packings, shown at 20 and 21 are utilized for sealing the rotatable actuating shaft 17 in the valve body and against leakage through the upper and lower portions 18 and 19 of the valve.

The butterfly valve disk is located off-center of the axis of rotation 22 of the rotatable shaft 17. In this regard, the valve disk includes a rearwardly extending projection 23 through which the shaft 17 runs and which is attached by means of screws or pins 24, for example, to the valve disk 12. A handle 25 is attached to the upper end of the actuating shaft 17 for rotating the valve disk between the open position, as shown in FIG. 1, and a closed position which is illustrated in FIG. 4 and as will be further described.

The valve body 11 is structured to receive a disk seal or seat ring 30, the details of which are best seen in FIGS. 3 and 4. The position of the seat ring 30 within the valve body is best shown in the cross-sectional view at FIG. 2 where it will be appreciated that the seat ring is circular and resides in a groove 31. This groove 31 is provided in the valve body and is further defined by surfaces of a seal retaining ring 32 secured within a groove 50 in the valve body by means of the screws 33. To replace the seat ring 30, it is only necessary to gain access to one face of the valve body and to remove the screws 33 and the retaining ring 32, whereupon the seat ring 30 can be removed and a new seal inserted. In connection with the disposition of the disk 12 and the seat ring 30, it should be noted in FIGS. 1 and 2 that the plane of the disk 12, when closed, and the location of the seat ring 30 is not located directly on the axis of rotation 22 of the shaft 17, but rather is offset therefrom. In the preferred embodiment, of course, it will further be noted that the plane of the disk 12 and the plane in which the seat ring 30 resides is normal to a longitudinal axis 15 extending through fluid passageway 14.

Turning now to the details of the seat ring 30 and its relationship to the valve body, the retaining ring and the disk, these are best seen in FIGS. 3 and 4 which depict the structure in greater clarity than is shown in FIG. 2. In FIG. 3, it will be seen that the groove 31 is more particularly defined by a side wall 40 cut into the valve body 11 and a bottom wall 41 at the lower end of the side wall 40. The groove 31 is further defined by a bottom wall portion 42 cut into the retaining ring 32, and a side wall 43 also cut into the retaining ring 32. Thus, the groove 31 comprises two side walls 40 and 43, and the groove bottom portions 41 and 42, defined respectively by the valve body 11 and the retaining ring 32. It will be appreciated that the groove 31 is circumferential with respect to the passageway 14 (FIG. 1) and that the groove has a mouth defined by the corner 44 of the retaining ring and the corner 45 of the valve body 11, the mouth being located in the interior surface 13 of the valve body. For clarity, the interior surface 13 is shown at 13' in FIG. 3 on the valve body 11 and as surface 13" of the retaining ring 32, it being appreciated that the surfaces 13' and 13" define a portion of an interior surface of the fluid passageway 14.

The shape of the groove 31 is generally dove-tailed such that the mouth defined by the corners 44 and 45 is narrower than the broader or wider groove bottom defined by the bottom portions 41 and 42. Thus, the grooved side walls 40 and 43 diverge outwardly from the interior surface 13. It will also be noted that the groove 31 includes parallel side wall portions 47 and 48, respectively, at the outer ends of the diverging side walls 40 and 43. Thus, the parallel side walls 47 and 48 connect the respective diverging side walls 40 and 43 to the grooved bottom portions 41 and 42, respectively.

Considering now the structure of the preferred seat ring 30, it is preferably made from a resilient material such as tetrafluoroethylene reinforced with 15% glass fibers and including 5% molybdenum. The seat ring 30 includes a sealing portion 60 having a disk sealing surface 61. Extending rearwardly or outwardly from the sealing portion 60 are two circumferential legs 62 and 63, respectively. As shown in FIGS. 3 and 4, the legs 62 and 63 diverge away from the sealing portion 60 such that they are approximately parallel to the diverging walls 40 and 43 of the groove in which the ring resides.

Each of the legs 62 and 63 has a respective end portion 64 and 65. The end portions 64 and 65 respectively define elongated inwardly extending flanges 66 and 67. Each of these flanges are circumferential flanges and extend toward each other. Also, end portions 64 and 65 define circular edges 68 and 69 where the legs and end portions terminate. Cut into the edges 68 and 69 are a plurality of notches or passageways 70 which extend around the circumference of the seat ring 30, as will be described. For purposes of illustration, these notches are shown on FIG. 3, respectively, as 70a and 70b.

The assembled seat ring 30 also includes a circular metallic back-up ring 75. As shown in FIG. 3, the back-up ring resides between the legs 62 and 63 and is spaced slightly from circumferential rear surface portion 76 of the sealing portion 60. This leaves a slight clearance between the back-up ring and surface 76 when the valve is open and the disk 12 is not seated. Preferably, such clearance is about 1/64 inch to about 3/32 inch, although other clearances may be suitable.

The metallic back-up ring 76 supports the seal ring and particularly the sealing portion 60, and tends to urge it into engagement with the disk 12, when the disk is in its closed position. As shown in FIG. 4, the clearance is taken up by radial and circumferential expansion of the seat ring 30 caused by the closed disk 12.

The metallic back-up ring includes a circumferential projection 77 extending circumferentially outwardly of the back-up ring. As shown in FIG. 3, the projection 77 lies between the elongated flanges 66 and 67 of the legs 62 and 63. Thus, the legs lie along the side of the metallic back-up ring 75 and along the sides of the circumferential projection 77 of the back-up ring 75 with flanges 66 and 67 of the legs capturing the back-up ring between the legs. This construction maintains the seat ring and the metallic back-up ring 75 integrally together. Of course, when the disk is closed, the clearance shown in FIG. 3 is taken up and a corresponding clearance appears between the outer steps or shoulder 78 of the back-up ring and the flanges 66 and 67. It should be appreciated that the back-up ring of the preferred embodiment is rather angular in shape, a round ring or a ring of some other cross-sectional shape could be used.

Finally, the seat ring structure further includes an "O"-ring 79 which is disposed between the elongated flanges 66 and 67 of the legs 62 and 63, and between the metallic back-up ring 75 (projection 77) and the bottom of the groove 31. In FIG. 3, the "O"-ring 79, together with the seat ring construction 30, is shown in a relaxed condition. In the open state, the legs 62 and 63 of the seat ring may be slightly spaced from the groove and retainer ring walls. In FIG. 4, the "O"-ring is shown in a loaded condition with the disk 12 closed and seat ring leg 63 sealingly pressed against wall 43.

FIG. 3 shows the valve disk 12 near closing with the seat from the normal upstream side of the valve. It should be appreciated that while the valve is herein described with respect to upstream or downstream sides, the valve is bi-directional and the description herein is for illustration only.

Continuing with a description of the valve, it is to be noted that the position of disk 12 in FIG. 3 is different from the position of the disk shown in FIGS. 1 and 2. In FIG. 3, it will be appreciated that the disk 12 is nearing its closed position, the direction of movement of the disk 12 being indicated by the arrow A. In this connection, and recalling that the disk and the seat ring are both offset from axis of rotation 22 of the disk rotating shaft, the disk 12 closes on the seal from both directions. The disk 12 closes on one-half of the seal 30' shown on the lefthand side of FIG. 1 from the downstream side of the valve and closes on the other one-half of the seal 30" shown on the righthand side of FIG. 1, from the upstream side of the valve (FIG. 3).

Of course, closure is aided by the fact that the disk and seal are offset from the axis of rotation. Specifically, the disk first contacts the seal at upper and lower diametrically opposite points on the sealing surface 61, and then continues sealing in both directions around the disk, until the disk is firmly seated.

Such seating action and movement, that is to say, where disks and seals are offset from the axis of disk rotation, are well known in the prior art and do not in themselves constitute any part of this invention. The seat ring described herein as a preferred embodiment of the invention, however, and its cooperation with the disk and the valve body to provide a seal, constitute a highly improved valve and seal for such offset disks.

Turning now to FIG. 4, the disk 12 and seat ring 30, are shown in the valve closed position. Upstream fluid, illustrated at F, is sealed in the righthand side of the valve body 11 and is prevented from flowing to the lefthand side of the valve body. When the valve disk 12 is moved to its closed position, as depicted in FIG. 4, the normal diameter between opposite points on sealing surfaces 61, is somewhat expanded to conform to the greater diameter of the disk 12. Thus, as the disk 12 is moved to its closed position, the disk tends to expand seat ring 30 radially and circumferentially and urges the seat ring 30 into the groove 31. Thus, in a valve closed condition, the sealing portion 60 of seat ring 30 does not extend so far into the passageway 14 as it did when the valve was in an open condition. Movement of the disk 12 into its closed position serves to compress the outer periphery 80 of the disk against the sealing surface 61 of the sealing portion 60 of the seat ring 30, and thus to seal off fluid flow between the disk 12 and the valve body 11.

While the sealing portion 60 and the legs 62 and 63 are somewhat resilient, the metallic back-up ring 75 also serves to enhance the seal of the surface 61 against the periphery 80 of the disk. Movement of the disk into engagement with the seal expands the seat ring 30, particularly circumferential surface 77 thereof, into contact with the only slighly yieldable back-up ring 75. Of course, the parameters of disk periphery 80, seat ring 30 and back-up ring 75 are selected so that the closed disk, seal and valve body provide an effective fluid seal.

While the seat ring is expanded by the closed disk, the metallic back-up ring supports it and may itself slightly expand within its limits of elasticity. Primarily, however, back-up ring will not permit the seat ring to permanently deflect or deform. Expansion of the seat ring 30, without the back-up ring as described, would cause the seat ring to cold flow, thus undesirably increasing its circumferential tolerances with respect to the disk. Due to the back-up ring, however, the seat ring is both supported and substantially confined when the valve disk is closed. Upon opening the metallic back-up ring, if expanded when closed, serves to urge the seat ring 30 back toward its original shape. In any event, the seat ring having been supported by the back-up ring is not so expanded that it cannot return to its original shape and tolerance. This combination, then, functions to maintain seal tolerance over a longer operating period and to effectively accommodate flats or aberrations in the disk without loss of sealing.

It will be noted that ordinarily, as the disk 12 is closed, and as the seat ring 30 is pushed radially outwardly into the groove 31, the parallel side walls 47 and 48 keep the legs 62 and 63 from diverging any further apart. Thus, at least the radially outward ends of the legs 62 and 63 tend to seal against the parallel walls 47 and 48.

In actuality, fluid under certain pressure conditions may migrate into the area between wall 40 and surface 62a. In other words, the pressurized fluid moves radially outwardly from the passageway 14 toward the end portion 64 of the leg 62. This tends to push leg 62 away from walls 40 and 47, and fluid leaks or migrates under the seal.

Any fluid migrating to beneath the leg, according to this invention, is used to enhance the seal between the disk and the seat ring by purposefully admitting it beside and behind the leg where it is operable to both pressure the seat ring against the opposite side of the groove for sealing and to push it toward the disk for sealing there. This invention, then, in one of its aspects, thus contemplates the use of leaking fluid to enhance the major seal. Specifically, the invention permits a slight amount of highly pressurized fluid to leak or migrate past the seal leg to a point where it can be used beneficially.

In order to further enhance the sealing capabilities of the valve, notches 70 are cut into circumferential portions of the legs. As shown in FIGS. 3 and 4, the notch 70a is cut into the end portion 64 of the leg 62. The notch 70a forms a fluid passageway between the space created by the wall 40 and the surface 62a of the leg, and the space defined between the bottom portion 41 of the groove and a bottom surface 62b of the leg 62. It will be appreciated that as the pressurized fluid F moves between the body 11 and the leg 62, and between the bottom of the groove and the end of the leg 62, it serves to push the entire seat ring structure in several directions. First, the pressurized fluid between the side wall 40 of the groove and the leg 62 tends to push the entire seat ring structure, as shown in FIG. 4, to the left, thus greatly enhancing the sealing of the leg 63 against the groove side wall 43. Also, the lateral pressure enhances the seal between the "O"-ring 79 and the flanges 66 and 67.

More importantly, as the pressurized fluid moves through the notch 70a into the area between the groove bottom 41 and the bottom of the leg portion 62b, the leg 62 is pushed radially inwardly toward the sealing portion 60 and thus toward the disk periphery 80. This significantly enhances and assists the seal exerted by the seal ring 30 against the disk 12.

It will also be appreciated that as the disk 12 is closed and the seat ring 30 is somewhat expanded into engagement with the back-up ring, the "O"-ring 79 is compressed to tightly seal against the rear projection 77 of the metallic back-up ring and the groove bottom surfaces 41 and 42. It also is compressed between the elongated flanges 66 and 67 of the end portions 64 and 65 of the legs. Thus, the "O"-ring tends to seal the pressurized fluid from moving past the "O"-ring into the space defined by the groove bottom portion 42 and the outer circumferential surface 63b of the leg 63. Even if fluid does migrate into this space, the pressurized fluid between the groove side wall 40 and the leg 62 tends to press the leg 63 against the side wall 43 and thus enhances and assists that seal to prevent fluid from leaking past the seal and back to the passageway 14, but on the downstream side of the disk 12.

While one notch 70a in the corner of the leg 62 as shown might be sufficient to admit pressurized fluid around the seal, it is more preferable to have a plurality of notches, as previously stated, cut into that same corner or edge. Particularly, it has been found suitable to utilize one notch for about every two inches of circumference of the edge of the end portion of the seat leg.

As previously stated, the valve structure shown in these drawings is functionally bi-directional. That is, while FIG. 4, for example, details the upstream side of the valve to the right, it would also be possible to utilize the same structure in the same orientation with the upstream side to the left. In this operation, of course, the action of the pressurized fluid on the valve seat ring 30 would be the opposite of what has been described with respect to FIG. 4. Thus, for example, the notch 70b would be utilized to transmit any migrating pressurized fluid between the groove wall 43 and the leg 63 into the groove space defined by the groove bottom 42 and the surface 63b of the leg 63, and thus, would seal the valve against leakage from the lefthand side of the disk (as shown in FIG. 4) to the right.

Finally, it should be appreciated that the particular structure described herein could be utilized in a reverse manner. That is, with the seat ring 30 disposed in a groove located in a periphery of the disk 12 and sealing with an interior surface of the fluid passageway. Moreover, the particular seat ring, as described herein, could be utilized in connection with other forms of valves as well.

It should finally be appreciated that the invention contemplates a free-floating seat ring and back-up ring, both within the groove and with respect to each other to further accommodate opening and closing to the valve disk and any flats or aberrations in the valve disk with loss of sealing.

Having now described the invention in detail, further modifications and objectives will be readily apparent to those of ordinary skill in the art, without departing from the scope of the invention, and applicant, accordingly, desires to be limited only by the claims appended hereto.

I claim:

1. Valve apparatus comprising:
    a valve body having an interior surface defining a fluid passageway,
    a valve disk for selectively closing said passageway,
    a circumferential groove in said valve body extending from said surface radially outward into said valve body,
    said groove having a bottom surface in said valve body and a tapered side wall,
    a retainer ring disposed on said valve body and having a tapered surface defining another side wall of said groove and a surface defining a bottom of said groove,
    said groove having a mouth at said interior surface, and being wider at its bottom than at its mouth,
    a tapered, resilient seat ring disposed in said groove for sealingly engaging a periphery of said disk,
    said seat ring having side legs, each substantially parallel to a respective tapered side wall of said groove, and said legs joined together at the mouth of said groove and normally extending through said mouth, forming a sealing portion,
    a metallic back-up ring disposed between said seat ring legs, circumscribing said sealing portions, and spaced from said sealing portion, and
    a resilient "O"-ring disposed between the bottom of said groove and said back-up ring and between ends of said legs.

2. Apparatus as in claim 1 further including a rotatable valve disk mounted in said passageway, said disk movable between open positions and a closed position wherein the periphery of said disk engages said seat ring, said seat ring sealing portion extending through the mouth of said groove when said disk is open and said disk, when closed, urging said seat ring into said groove.

3. Apparatus as in claim 1 or 2 wherein said groove has parallel side walls at the bottom thereof, extending between said tapered side walls, respectively, and said bottom, and wherein said seat ring is movable in a reciprocal direction into and out of said groove, upon respective closing and opening of said disk, said parallel side walls engaging respective end portions of the legs of said seat ring and holding said legs from moving apart when said seat ring moves into said groove.

4. Apparatus as in claim 1 wherein each of said legs have end portions proximate the bottom of said groove, said end portions defining in part circumferential elongated flanges extending downwardly from each leg toward the other and engaging an outer periphery of said metallic back-up ring when said valve disk is in an open position.

5. Apparatus as in claim 4 wherein said metallic back-up ring has a circumferential projection on the outer periphery thereof and extending toward said groove bottom, said elongated flanges of each leg end portion engaging sides of said projection.

6. Apparatus as in claim 5 wherein said "O"-ring is disposed between said elongated flanges of the leg end portions, and engages said circumferential projection of said metallic back-up ring.

7. Apparatus as in claim 1 including means to transmit fluid under pressure from said fluid passageway to a space between the groove bottom and said seat ring to pressurize said ring against said disk.

8. Apparatus as in claim 7 wherein each of said side legs has an end portion defining an edge adjacent a respective side wall of said groove, and wherein said fluid transmitting means further includes at least one notch in said edge communicating between a space defined between the seat ring and the bottom of the groove and a space defined between said side leg and the respective side wall of the groove.

9. Apparatus as in claim 8 wherein said disk urges said seat ring into said groove when said disk is closed and wherein fluid under pressure in said valve body acts againt said seat ring and an upstream side leg thereof, pushes said side leg away from its adjacent groove side wall, migrates between said side leg and said side wall through said notch to said space between the seat ring and bottom of the groove, and presses said seat ring radially inwardly against a periphery of said disk to improve the seal between said disk and said seat ring.

10. Apparatus as in claim 8 or 9 wherein said disk urges said seat ring into said groove when said disk is closed and said "O"-ring is sealingly compressed between said side legs, said metallic back-up ring and said groove bottom to seal pressurized fluid in a space between a side leg and groove bottom from a space between the opposite side leg and groove bottom.

11. Valve apparatus including
    a valve body having a fluid passageway defined by an interior surface thereof,
    a circumferential groove in said body having a mouth open to said passageway at said interior surface and extending radially from said passageway to a groove bottom wider than said mouth, said groove having side walls diverging away from said mouth,
    a disk rotatably mounted in said valve body and having a periphery disposed proximate said mouth when said disk is rotated from an open to a closed position,
    a resilient seat ring in said groove having a disk sealing portion extending through said mouth for sealing engagement with said disk periphery, and two side legs extending rearwardly from said sealing portion into said groove and along said side walls, but being normally spaced from said groove bottom,
    a circumferential metallic back-up ring means disposed between said side legs and normally spaced from said sealing portion, said back-up ring engaging said sealing portion when said disk is closed for biasing said sealing portion against said disk periphery, and
    an "O"-ring disposed between rear ends of said side legs and between said metallic back-up ring means and said groove bottom.

12. Apparatus as in claim 11 further including at least one fluid passageway means in at least one side leg communicating between a space between an end of said side leg and said groove bottom at one end of said passageway means and a space between said side leg and its adjacent side wall for admitting pressurized fluid behind said seat ring to pressure said seat ring's sealing portion against a periphery of said disk.

13. Apparatus as in claim 11 wherein one groove side wall and a portion of said groove bottom are defined by said valve body, and another groove side wall and groove bottom portion are defined by a circular retaining ring secured on said valve body.

14. Apparatus as in claim 11 wherein said disk, when closed, urges said seat ring in a direction into said groove.

15. Apparatus as in claim 11, 13 or 14 wherein said groove has parallel side walls at the bottom thereof, extending between said diverging side walls respectively and said bottom, and wherein said seat ring is movable in a reciprocal direction into and out of said groove upon respective closing and opening of said disk, said parallel side walls engaging respective end portions of the legs of said seat ring and holding said legs from moving apart when said seat ring moves into said groove.

16. Apparatus as in claim 11 wherein each of said legs have end portions proximate the bottom of said groove, said end portions defining in part circumferential elongated flanges extending inwardly from each leg toward the other and engaging an outer periphery of said metallic back-up ring when said valve disk is closed.

17. Apparatus as in claim 16 wherein said metallic back-up ring has a circumferential projection on the outer periphery thereof and extending toward said groove bottom, said elongated flanges of each leg end portion engaging sides of said projection.

18. Apparatus as in claim 17 wherein said "O"-ring is disposed between said elongated flanges of the leg end portions, and engages said circumferential projection of said metallic back-up ring.

19. Apparatus as in claim 12 wherein said disk urges said seat ring into said groove when said disk is closed and wherein fluid under pressure in said valve body acts against said seat ring and an upstream side leg thereof pushes said side leg away from its adjacent groove side wall, migrates between said side leg and said side wall through said notch to said space between the seat ring and bottom of the groove, and presses said seat ring circumferentially against a periphery of said disk to improve the seal between said disk and said seat ring.

20. Apparatus as in claim 19 wherein said disk urges said seat ring into said groove when said disk is closed and said "O"-ring is sealingly compressed between said side legs, said metallic back-up ring and said groove bottom to seal off pressurized fluid in a space between a side leg and groove bottom from a space between the opposite side leg and groove bottom.

21. Valve apparatus including
a valve body having a fluid passageway defined by an interior surface thereof,
a valve member rotatably mounted in said valve body and having a periphery,
a circumferential groove in one of said body and said valve member periphery, said groove having a mouth open to said passageway proximate said interior surface and extending radially from said passageway to a groove bottom wider than said mouth, said groove having side walls diverging away from said mouth,
a resilient seat ring in said groove having a disk sealing portion extending through said mouth for sealing engagement with one of said valve member periphery and said interior surface, and two side legs extending rearwardly from said sealing portion into said groove and along said side walls, but being normally spaced from said groove bottom,
a circumferential metallic back-up ring means disposed between said side legs and against said sealing portion for biasing said sealing portion against said disk periphery when said disk is closed, said back-up ring means being normally spaced from said sealing portion when said disk is open, and
an "O"-ring disposed between rear ends of said side legs and between said metallic back-up ring means and said groove bottom.

22. Apparatus as in claim 21 wherein said groove includes parallel side walls extending from ends of said diverging side walls to said groove bottom.

23. Apparatus as in claim 21 including means on said side legs engaging said back-up ring means for holding said seat ring in said groove.

24. A seat ring apparatus for use in a valve for sealing against the periphery of a valving member, said seat ring apparatus comprising
a circumferential resilient sealing portion,
two circumferential legs extending radially outward from opposite sides of said sealing portion, each of said legs having an end portion defining an elongated circumferential flange extending from said end portion toward the other flange, and
a circumferential metallic back-up ring disposed between said legs and spaced from a rear surface of said sealing portion, said elongated flanges extending over and engaging rear surfaces of said metallic back-up ring.

25. Apparatus as in claim 24 wherein said back-up ring includes a circumferential projection extending rearwardly from said back-up ring and between the elongated flanges of said legs.

26. Apparatus as in claim 25 wherein each of said leg end portions defines a circular edge on an outer side of said end portion, and further including a plurality of notches in at least one of said edges.

27. Apparatus as in claim 25 wherein said legs diverge apart from said sealing portion.

28. Apparatus as in claim 25 further including an "O"-ring surrounding an outer periphery of said circumferential projection from said back-up ring and disposed between the elongated flanges of said leg end portions.

29. Apparatus as in claim 24 including means on said legs engaging said back-up ring for holding said seat ring on said back-up ring.

30. Apparatus as in claim 24 wherein said back-up ring is yieldable.

* * * * *